Oct. 27, 1970  KENJIRO YANAGASE ET AL  3,536,598
PRODUCTION OF CHLORINE FROM SEA WATER
Filed July 19, 1967  3 Sheets-Sheet 1
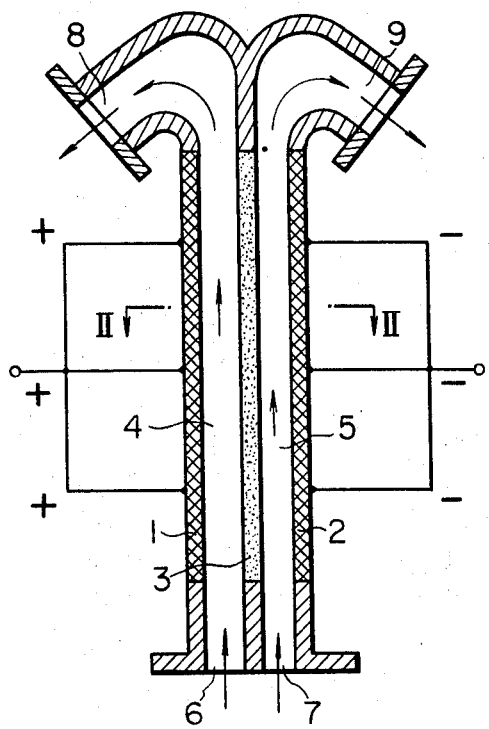
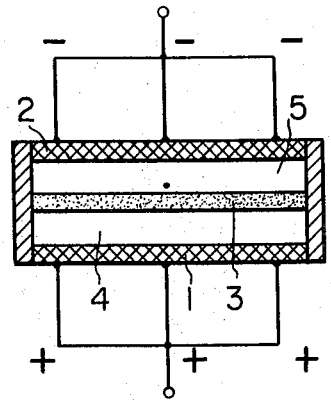
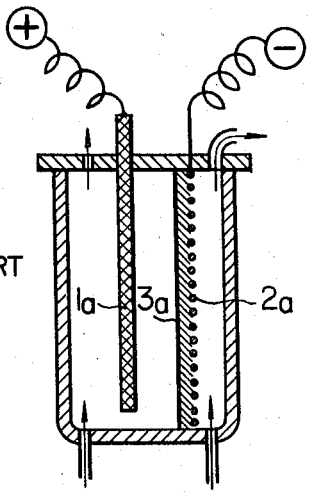
PRIOR ART
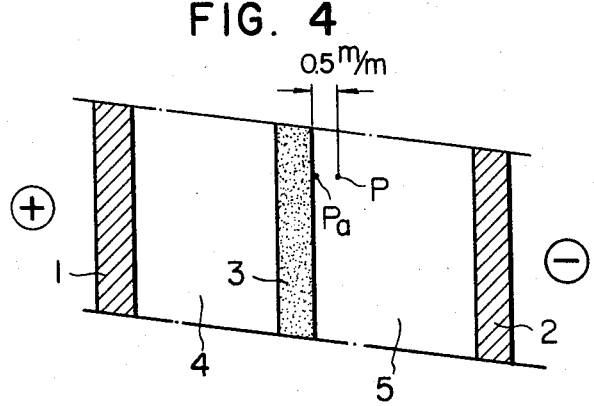
Kenjiro Yanagase
Tsutomu Yanagase
Yukio Suginohara
INVENTOR.
BY George B. Oujevolk
Attorney B = A = 5, d = 2

Ba = 4, Aa = 6
d = 2

`United States Patent Office`

3,536,598
Patented Oct. 27, 1970

3,536,598
PRODUCTION OF CHLORINE FROM SEA WATER
Kenjiro Yanagase, 2150 Mukoyama, Fukuma-machi, Fukuoka-ken, Japan; Tsutomu Yanagase, 3, 1-chome, Miyuki-machi, Fukuoka-shi, Fukuoka-ken, Japan; and Yukio Suginohara, Mubanchi, Matsuzaki, Fukuoka-shi, Fukuoka-ken, Japan
Filed July 19, 1967, Ser. No. 652,401
Int. Cl. C01b 7/06
U.S. Cl. 204—128                              5 Claims

ABSTRACT OF THE DISCLOSURE

Direct electrolysis of sea water is carried out as the sea water is caused to flow steadily through parallel anodic and cathodic flow paths separated by a porous diaphragm and respectively formed between the diaphragm and parallel anode and cathode plates between which the diaphragm is parallelly positioned, whereby total freed chlorine as a mixture of chlorine gas and sea water containing dissolved freed chlorine is obtained. Deposition of impurities on the diaphragm is prevented by controlling the pH value of the electrolyte.

---

This invention relates to direct electrolysis of sea water. More particularly, the invention concerns a new and improved technique for producing chlorine gas and sea water containing dissolved freed chlorine.

In cases where sea water is used as the water supplied to condensers, coolers, and other equipment in thermal power stations and manufacturing plants in coastal areas, various kinds of marine organisms tend to adhere to these items of equipment at parts where they are contacted by the sea water. In order to prevent this occurrence, the method of injecting chlorine gas from cylinders (or bottles) into the sea water is widely used.

On one hand, since sea water contains, in one kilogram thereof, approximately 23 grams of sodium chloride (NaCl), there have been attempts to produce chlorine gas and caustic soda (NaOH) from sea water as a raw material by electrolysis. However, it appears that there have not yet been any instance of practical application of this method on an economical scale.

In comparison with the process used in the common salt electrolysis industry, in general, direct electrolysis of sea water is accompanied by the following difficulties.

(1) Since the salt concentration in sea water is very low, the electrical conductivity of the electrolyte is low, whereby the power efficiency is correspondingly low for the same apparatus and operational conditions.

(2) Since the raw material sea water is used directly without any purification whatsoever to remove substances contained therein other than sodium chloride, these other substances give rise to difficulties.

More specifically, approximately 4.9 grams of magnesium chloride ($MgCl_2$) is contained in one kilogram of sea water and, in the case of diaphragm electrolysis, becomes magnesium hydroxide, which adheres to and grows on the diaphragm, thereby obstructing the flow of the sea water and transmission of electric power. Consequently, continuous electrolysis over a long period becomes impossible.

Furthermore, approximately 3.9 grams of sodium sulphate ($Na_2SO_4$) is contained in one kilogram of sea water and gives rise to discharge of oxygen at the anode, which discharge is considered to be a serious cause of lowering of the current efficiency.

Because of difficulties as set forth above, there has been no instance up to the present time of success in commercially producing chlorine gas or caustic soda with sea water as a raw material, as far as we are aware.

It is an object of the present invention to provide a commercially feasible process and apparatus for utilizing sea water, which exists in limitless quantity, as a raw material to produce economically by direct electrolysis a product consisting of total freed chlorine.

This total freed chlorine is not merely the chlorine gas in the chlorine freed by the electrolysis but is the aggregate of this chlorine gas and the freed chlorine existing as a solute in the resulting sea water.

When sea water is electrolysed as it is constantly caused to flow in an electrolytic cell having a construction of the water electrolysis cell type, instead of an electrolytic vessel of the diaphragm type for commercial electrolysis of saturated salt solutions, most of the chlorine thereby freed assumes the state of a solute dissolved in the flowing sea water, and one portion of the freed chlorine becomes chlorine gas. These two kinds of chlorines, in aggregate, are herein considered to constitute the total freed chlorine.

Thus, it should be understood that it is not an object of the invention to produce merely chlorine gas. The invention contemplates the economical production of the above stated two kinds of chlorines constituting the total freed chlorine. The total quantity of these two chlorines is hereinafter referred to as "effective chlorine."

Another object of the invention is to solve the problem of the lowering of process efficiency due to the presence of substances other than sodium chloride in sea water, which problem is encountered in electrolysis with the conventional diaphragm type vessel for salt electrolysis. This problem has been solved as a result of our research on methods of electrolysis by means of an electrolytic cell of the water electrolytic cell type.

According to the present invention, briefly summarized, there is provided a method for producing effective chlorine by direct electrolysis of sea water as it is caused to flow steadily and simultaneously in parallel anodic and cathodic flow paths respectively on opposite sides of a porous diaphragm parallelly interposed between and spaced apart from parallel anode and cathode plates mutually in narrowly spaced-apart disposition, thereby to obtain freed chlorine at the anode plate in the anodic flow path and to produce this freed chlorine as the effective chlorine.

According to the invention there is further provided apparatus for practicing the above described method.

Deposition of magnesium hydroxide on the diaphragm is prevented by controlling the pH value of the electrolyte as described in detail hereinafter.

The nature, principle, and details of the invention as well as the utility thereof, will be more clearly apparent from the following detailed description with respect to preferred embodiments of the invention when read in conjunction with the accompanying drawings, in which like parts are designated by like reference numerals and characters.

In the drawings:

FIG. 1 is a diagrammatic side elevational view, in vertical section, showing the essential parts of one example of a sea water electrolytic cell constituting a preferred embodiment of the invention;

FIG. 2 is a plan view, in section taken in the plane indicated by line II—II in FIG. 1;

FIG. 3 is a diagrammatic side elevation view, in vertical section showing the essential parts of one example of a salt electrolysis vessel of diaphragm type presently in commercial use;

FIG. 4 is a fragmentary side elevational view, in vertical section, showing the point at which the pH value of the electrolyte is measured in the electrolytic cell shown in FIGS. 1 and 2;

Figure 6A:
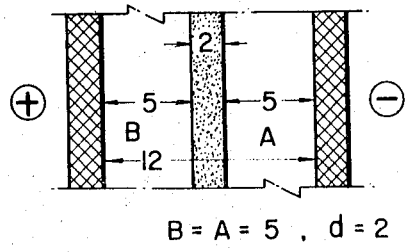
Figure 6B:
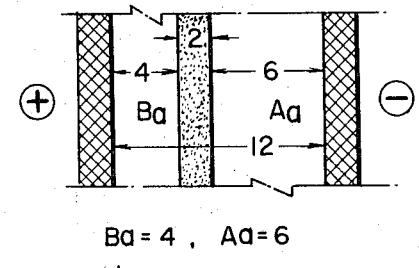
Figure 7:
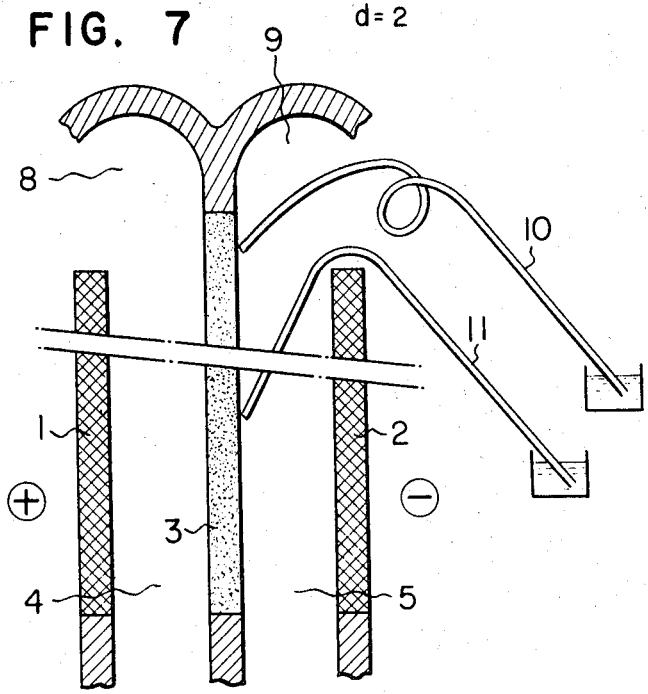
Figure 8A:
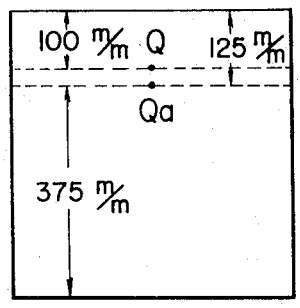
Figure 8B:
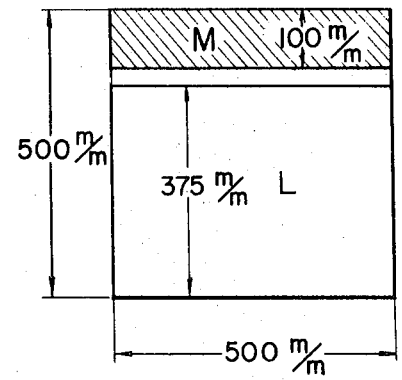
Figure 9A:
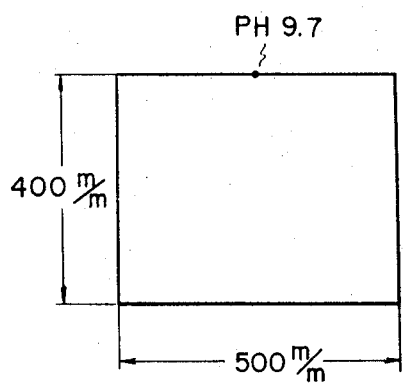
Figure 9B:
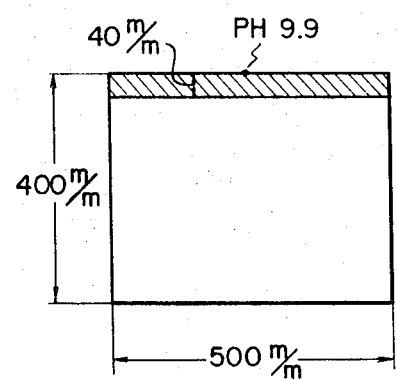

FIGS. 6(a) and 6(b) are fragmentary side elevational views, in vertical section, showing spacings between the diaphragm and the anode and cathode plates;

FIG. 7 is a diagrammatic side elevational view, in vertical section, showing the manner in which the electrolyte is sampled for measurement of pH values;

FIGS. 8(a) and 8(b) are elevational views showing the surface of the diaphragm in the cathode flow chamber and indicating an example of the relationship between the pH value of the electrolyte and deposition of magnesium hydroxide;

FIGS. 9(a) and 9(b) are views similar to FIGS. 8(a) and 8(b) in the case of another example of the diaphragm and operational conditions.

In a preferred embodiment of the invention as illustrated in FIGS. 1 and 2, there are provided two electrodes 1 and 2 (anode and cathode) in vertical, parallel, and spaced apart disposition. A porous diaphragm 3 is interposed between the electrodes 1 and 2 at an intermediate position therebetween and substantially parallel thereto, thereby forming narrow anodic and cathodic flow chambers 4 and 5 respectively on the two opposite sides of the diaphragm 3. These flow chambers 4 and 5 are respectively provided at their lower ends with sea water inlets 6 and 7 and at their upper ends with anode and cathode electrolyte outlets 8 and 9.

During the operation of this electrolysis cell, sea water containing freed chlorine and some free chlorine gas are discharged through the anode outlet 8, while hydrogen gas and sea water having slight alkalinity because of the caustic soda formed and containing magnesium hydroxide are discharged from the cathode outlet 9.

The sea water inlets 6 and 7 and outlets 8 and 9 are made amply large so that the cross sectional distribution of velocity of the liquid flowing through the electrolysis chambers 4 and 5 will be substantially uniform and so that the flow, particularly in the cathodic flow chamber 5 will not vary at the ends and at the middle part.

In contrast to the conventional salt electrolysis vessel as illustrated in FIG. 3, which is provided with an anode 1a, a cathode 2a in the form of a wire mesh, and a diaphragm 3a placed in close contact with the cathode 2a, the diaphragm 3 in the apparatus of the instant invention, as shown in FIGS. 1 and 2, is not in close adherence to either of the electrode 1 and 2, and, structurally, the apparatus is of the water electrolysis type rather than the salt electrolysis type. That is, between the cathods 2 and the diaphragm 3, there is provided a space (the cathodic flow chamber 5) through which sea water can flow from the bottom toward the top.

Materials suitable for fabrication of the anode 1 are chlorine-resistant anode materials such as platinum, titanium plate, plated with platinum or with an alloy thereof, graphite, and silver added lead. Materials suitable for the cathode 2 are alkali-resistant materials such as iron plate, titanium, nickel, and chromium. Examples of materials suitable for the diaphragm 3 are asbestos fabric, synthetic fibre fabrics, and porous synthetic resin plates. The diaphragm 3, however, is not an ion-exchange membrane.

As shown in FIGS. 1 and 2, the diaphragm 3 has a planar area which is not less than that of either of the electrodes 1 and 2.

The above described apparatus according to the invention is adapted to receive sea water from sea water supply pipes (not shown), through the sea water inlets 6 and 7, and into the two electrolysis chambers 4 and 5, where electrolysis of the sea water as the electrolyte is carried out with DC power.

By this electrolysis chlorine is liberated in the anodic chamber 4, and the greater part of this freed chlorine immediately dissolves in the flowing sea water. A part of the freed chlorine, in the form of gaseous chlorine, is discharged together with the flowing sea water through the outlet 8. In the cathodic chamber 5, hydrogen gas is generated, and, at the same time, caustic soda is formed and dissolves in the sea water. A part of this caustic soda causes a part of the magnesium in the sea water to become magnesium hydroxide. That is, the following reaction occurs.

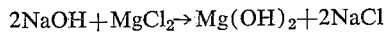

$$2NaOH + MgCl_2 \rightarrow Mg(OH)_2 + 2NaCl$$

In the development of the present invention, various cells as illustrated in FIGS. 1 and 2 with electrode plates of heights from 100 to 500 millimetres and widths of from 100 to 500 mm. were fabricated and used for experimental research, from which the following facts were confirmed.

When electrolysis of sea water is carried as it is caused to flow at a mean velocity in the electrode chambers 4 and 5 of 1 cm./sec. or more, most of the chlorine freed at the anode remains in a dissolved state in the flowing sea water, and the chlorine which is given off as gaseous chlorine constitutes only a minor part of the total freed chlorine. Then, if the sum total of the dissolved chlorine and the chlorine gas, i.e., the effective chlorine, is made the objective of production, a current efficiency as high as 70 percent can be obtained.

However, when graphite is used for the anode, the current efficiency will be of the order of from 25 to 30 percent.

Furthermore, the electric power consumption for producing this effective chlorine can also be reduced to a rate which permits economical practice of the invention by selecting a narrow spacing between the two electrodes 1 and 2 and by selecting a suitable anode (for example, platinum-plated titanium plate or silver-added lead) in the case wherein electrolysis is carried out with a suitable current density in the electrolysis conditions.

In the practice of the present invention, electrolysis is carried out without removing the magnesium compounds in the sea water. For this reason, caustic soda is formed at the cathode by the electrolysis of salt (NaCl), but in the sea water, this caustic soda causes the aforementioned reaction whereby one part of the magnesium in the sea water becomes magnesium hydroxide, which precipitates or is suspended as fine solid particles in the sea water.

In the known method of electrolysis wherein sea water is supplied to a salt electrolysis bath, this magnesium hydroxide deposits on the electrodes and within the diaphragm to clog the pores of the diaphragm and obstruct the flow of the electrolyte and conduction of electric current, whereby continuation of the electrolysis becomes technically difficult.

In the case of the electrolytic cell of the present invention, however, the following discoveries were made.

(1) A greater part of this magnesium hydroxide is discharged out together with hydrogen by the flowing sea water.

(2) There is no adherence and growth to a thick layer of the magnesium hydroxide on the cathode surface. Accordingly, there is no obstruction of electrolysis over a long period.

(3) It was found that in some cases the magnesium hydroxide adhered to the diaphragm and clogged the pores thereof or grew to a thick layer on the surface thereof, while in other cases adherence and growth did not occur, even when the electrolysis was continued for a long time.

It has been found, as a result of numerous experiments, that this behaviour of the magnesium hydroxide is influenced greatly by the pH value of the flowing sea water electrolyte at positions in the proximity of the diaphragm.

When the pH value at a point (point P in FIG. 4) in the cathodic chamber 5 at a perpendicular distance of 0.5 mm. from the diaphragm surface in the direction of the cathode plate 2, as measured with respect to a sample of the electrolyte taken from point P by means of a capillary tube, is 9.7 or less, adhesion and growth of magnesium hydroxide on the diaphragm at point Pa did not occur, even when electrolysis is carried out over a long period. When the pH value at this point P is 9.8 or higher, and electrolysis is continued over a long period, magnesium hydroxide adheres at point Pa on the diaphragm 3 and forms a layer which progressively increases in thickness until, ultimately, it reaches the surface of the cathode 2.

The pH value at a certain point separated by 0.5 mm. from the diaphragm surface in the cathodic chamber 5 decreases and approaches the pH value of the raw material sea water with:

(1) Decreasing current density;
(2) Increasing velocity of the flowing electrolyte (however, 1 cm./sec. or higher); and
(3) Increasing volume space of the cathodic chamber 5. That is, when the current density increases, the pH value at that point increases.

Figure 5:
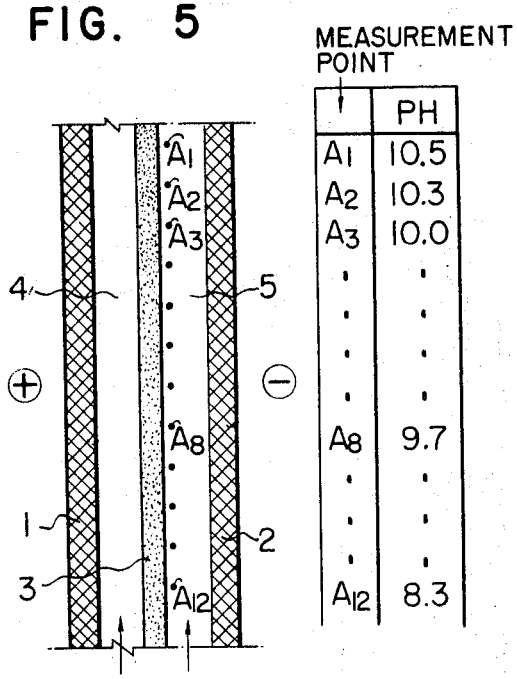
FIG. 5 shows a side elevational view, in vertical section, of the electrolytic cell and a table indicating an example of the vertical distribution of pH value of the electrolyte in the electrolytic cell of the invention.

Furthermore, under the same electrolysis conditions, the pH value of a point separated by 0.5 mm. from the diaphragm surface in the cathodic chamber 5 decreases and approaches the pH value of the original sea water as the distance of that point from the top of the diaphragm increases toward the bottom. That is, the pH value of the electrolyte in the cathodic chamber 5 at 0.5 mm. from the vertically disposed diaphragm 3 decreases progressively from top to bottom in the chamber 5, as indicated in FIG. 5.

Accordingly, a point in the cathodic chamber 5 at a distance of 0.5 mm. from uppermost part of the diaphragm 3 has a pH value which is higher than any other similar point at a lower position. This means that, as long as the pH value at this uppermost point is maintained at 9.7 or lower value, it will never be exceeded by the pH value at any other point which is 0.5 mm. from the diaphragm. Therefore, deposition of magnesium hydroxide on the diaphragm can be prevented by controlling the electrolysis conditions so that the pH value of a point in the cathodic chamber 5 at a perpendicular distance of 0.5 mm. from the uppermost part of the diaphragm surface will be 9.7 or less.

Furthermore, it was confirmed that when, during electrolysis under a certain group of conditions, the pH value at a first point which is a certain specific distance below the uppermost part of the diaphragm is 9.7, and the pH value at a second point somewhat higher becomes 9.8, the pH value at any point higher than the second point becomes higher than 9.8. Moreover, the pH value at any point below the first point of pH value 9.7 is less than 9.7. When the electrolysis is continued with the pH distribution in this state, magnesium hydroxide deposits and grows on the part of the diaphragm surface above the first point, but no deposition whatsoever is observable below the first point. The rise of the pH value of the flowing sea water in the cathode chamber 5 is due to the caustic soda produced therein.

The discovery of this relationship between the behaviour of magnesium hydroxide and the electrolyte pH value has made possible continuous operation over a long period of an electrolysis cell of the instant type. Furthermore, maintenance of the above described favourable conditions is within the scope of the possibility of economically practicing the invention.

All of the above mentioned points of pH measurement are at a perpendicular distance of 0.5 mm. from the diaphragm surface in the cathode chmaber 5, and the pH values of other points nearer to the cathode 2 (for the same electrolysis conditions and same height level) are higher.

The distances respectively between the diaphragm 3 and the two electrodes 1 and 2 are not necessarily equal. In the case where the distance $Aa$ between the cathode inner surface and the opposed surface of the diaphragm in the cathodic chamber 5 is made more than the distance $Ba$ between the opposed surfaces of the anode and the diaphragm in the anodic chamber 4 as shown in FIG. 6($b$), that is, $Aa > Ba$, the pH value at a pH measurement point, under the same electrolysis conditions, is lower than that in the case where the distances A and B are equal, that is, $A = B$ as shown in FIG. 6($a$), the relationship between the distances being as follows:

$$A + d + B = Aa + d + Ba$$

where $d$ is the thickness of the diaphragm.

Measurements of pH values in the electrolytic cell are carried out by using capillary tubes to take samples of the electrolyte at points at a perpendicular distance of 0.5 mm. from the surface of the diaphragm in the cathode chamber 5, for example, in the following manner.

Suitable lengths of silicone rubber tubing 10, 11, etc., of 0.5-mm. inner diameter and approximately 1-mm. outer diameter are disposed as indicated in FIG. 7, and samples of the electrolyte are drawn out through these tubes. The tubes are so positioned and held that they will not disturb the flow of the electrolyte at the points where the samples are drawn.

Since the electrolyte inlets 6 and 7 and outlets 8 and 9 are made amply large, as mentioned hereinbefore, the electrolyte flow velocity does not vary from the centre to the lateral edges of the electrodes, and the pH values measured at the centre and at the edges are of the same value.

Measurements of the pH values may, of course, be carried out by means of a special pH measuring electrode disposed directly within the cathode chamber 5.

The aforementioned uppermost part of the diaphragm 3 is the upper horizontal boundary (of, for example, 500-mm. length) in the electrolytic cell as shown in FIG. 1. Since all points on this boundary have the same pH value in the electrolytic cell of the invention, the pH value of the uppermost part can be measured at any point on this boundary. In the examples to follow, the pH values were measured at the centre of the 500-mm. upper boundary of the diaphragm 3.

If the electrolyte flow velocity at the centre is higher than those of other points on the upper boundary, the corresponding measured pH values will be different. In such a case, the pH value as measured at the point at which the highest pH is indicated can be used as the criterion for controlling the electrolysis conditions to accomplish continuous electrolysis.

(4) It was further found that a salt electrolysis vessel of ordinary diaphragm type for commercial production (FIG. 3) cannot be applied for achieving the objects of the present invention. The reason for this is that, since there is no space for flow of sea water between the cathode 2a and the diaphragm 3a, the formation of magnesium hydroxide on the diaphragm surface or in the pores thereof cannot be prevented.

(5) The purity of the hydrogen gas generated at the cathode of the electrolytic cell of the invention, in terms of $O_2$ content, was found to be from 0.3 to 0.5 percent by volume. Furthermore, when the magnesium hydroxide discharged from the cathodic chamber 5 was separated out by filtration and washed with pure water, it was found to contain an extremely low content of impurities such as calcium.

The minimum freed chlorine concentration in sea water for prevention of adherence of marine organisms to structures in contact with the sea water is considered, in general, to be from 0.1 to 5 p.p.m., although it differs with factors such as the organic substances existing in the sea water. Sea water containing effective chlorine produced by direct electrolysis of sea water contains, in general, from 100 to 500 p.p.m., approximately, of effective chlorine. Therefore, by diluting this liquid with untreated sea water, sea water of a free chlorine concentration necessary for preventing adherence of marine organisms can be obtained.

As mentioned hereinbefore, a feature of the present invention is the accomplishment of electrolysis as the electrolyte is caused to flow with uniform velocity of 1 cm./sec. or higher between the cathode plate 2 and the diaphragm 3. Without this flow of sea water, deposition of magnesium hydroxide cannot be prevented, and continuous operation over a long period is not possible.

Before the raw material sea water is supplied to the electrolytic cell of the inventor is filtered to remove solids and oil therein if necessary, but it is not necessary to resort to chemical procedures to remove impurities dissolved in this sea water. Furthermore, it is not necessary to add substances such as sulphuric acid to the sea water.

In order to indicate still more fully the nature and utility of the invention, the following examples of practice thereof are set forth, it being understood that these examples are presented as illustrative only and that they are not intended to limit the scope of the invention.

Throughout these examples, the electrolyte flow velocities in the anode and cathode chambers were equal unless otherwise specified. Solid particles and oil in the sea water were removed by filtration before use of the sea water.

EXAMPLE 1

An electrolytic cell of the organization described hereinbefore and as illustrated by FIGS. 1 and 2 was fabricated with an anode 1 of platinum-plated titanium plate (platinum thickness of 1 micron), a cathode 2 of titanium plate, and a porous diaphragm 3 of asbestos fabric of 2-mm. thickness, the planar dimensions of each of these three components being 500 x 500 mm. The distance between the two electrode plates 1 and 2 was 10 mm.

A current of 100 amperes was passed through the electrolyte with a current density of 4 a./dm.$^2$ as sea water was caused to flow within the electrolytic chambers 4 and 5 at a velocity of 5.2 cm./sec. The electrode voltage after 10 minutes of application of the current was 4.9 volts.

The ratio of the quantities of the chlorine gas and dissolved chlorine thus formed was 1:11, and the current efficiency of the effective chlorine (total of the gaseous and dissolved chlorines) was 71.1 percent.

When all of the generated chlorine gas was dissolved in the flowing sea water, the chlorine concentration of the chlorine-containing sea water discharged from the cathodic chamber 5 was found to be 0.25 gram of $Cl_2$/litre. When hydrogen gas from the cathodic chamber 5 was dried, it was found to contain 0.5 percent by volume of oxygen.

Magnesium hydroxide ($Mg(OH)_2$) discharged from the cathode chamber 5 was separated out by filtration, washed with pure water, and then heated to red heat to produce MgO, which was found to have a purity of 99.8 percent.

EXAMPLE 2

In an electrolytic cell of the same organization as that in Example 1, a current of 200 amperes was passed through the electrolyte (current density of 8 a./dm.$^2$) as sea water was caused to flow through the electrode chambers at a velocity of 6.1 cm./sec.

The voltage between the electrodes after 10 minutes from the start of current flow was 6.1 volts. The ratio of the chlorine gas and dissolved free chlorine thus produced and discharged was found to be 1:8, and the current efficiency of the effective chlorine was 70.0 percent.

Furthermore, when all of the chlorine gas was dissolved in the electrolyte, the effective chlorine concentration was 0.41 gram/litre.

EXAMPLE 3

In this example and other examples to follow, it is to be understood that the ratio A$a$:$d$:B$a$ is 6:2:4 as shown in FIG. 6($b$) unless otherwise specified.

3.1.—In an electrolytic cell according to the invention the same anode, 3.1. Plate 1, cathode plate 2, and diaphragm 3 as those in Example 1 were used with a distance of 12 mm. between the electrodes and spacings between the diaphragm 3 and electrodes 1 and 2 as set forth above.

This cell was operated with sea water supplied at a rate to produce a flow velocity of 9.8 cm./sec. in the electrode chambers and with a current of 100 amperes applied with a current density of 4.0 a./dm.$^2$. The voltage between the electrodes was 5.4 volts after 10 minutes from the start of application of current, and the current efficiency of the effective chlorine was 70.2 percent.

At this time, the pH value at a point Q, as shown in FIG. 8($a$), at a distance of 100 mm. below the uppermost part of the diaphragm 3 and at a perpendicular distance of 0.5 mm. from the diaphragm surface in the cathodic chamber 5 was 9.8 as measured by taking a sample of the liquid at point Q by means of a capillary tube of 0.5-mm. inner diameter and 1-mm. outer diameter. The pH value similarly measured at a point Q$a$ at a distance of 125 mm. below the uppermost part of the diaphragm 3, also as shown in FIG. 8($a$), was 9.7.

After 18 hours of continuous operation, the voltage between the electrodes was found to be 5.7 volts, and the current efficiency was 69.0 percent. Then, after 25 hours of continuous operation, the operation was stopped, and the electrolytic cell was disassembled for inspection of the state of deposition of magnesium hydroxide on the diaphragm 3.

It was found that, over the area of the diaphragm from its upper boundary to a level 100 mm. therebelow (i.e., in the upper area M of 100-mm. height and 500-mm. width as indicated by shading in FIG. 8($b$), magnesium hydroxide had deposited to form a layer of a thickness of from 0.5 to 1 mm. In contrast, no deposition of magnesium hydroxide whatsoever was observable in the lower area L, as indicated in FIG. 8($b$), of 375-mm. height and 500-mm. width.

3.2.—Another electrolytic cell identical to that in Example 3.1. above was simultaneously operated under the same conditions as set forth above except that it was continuously operated for 50 hours and then disassembled for inspection. It was found that in this cell the deposited magnesium hydroxide had reached a thickness of 3 mm. over the upper 100 x 500-mm. area. However, in the lower 375 x 500-mm. area, no deposition of magnesium hydroxide whatsoever was observable.

3.3.—An electrolytic cell similar to that in Example 3.1. above except for electrode plates of 400-mm. height and 500-mm. width and an asbestos fabric (2-mm. thickness) of 400-mm. height and 500-mm. width was operated under the same conditions as set forth in Example 3.1.

A current of 80 amperes was applied with a current density of 4.0 a./dm.$^2$ as sea water was caused to flow through the electrode chambers at a velocity of 4.8 cm./sec. The voltage between the electrodes 10 minutes after the start of current application was 5.4 volts, at which time the pH value was measured at the upper boundary of the diaphragm at a perpendicular distance of 0.5 mm. therefrom was 9.7 as indicated in FIG. 9($a$).

After 170 hours of continuous operation, at which time the voltage between the electrodes was 5.5 volts, the operation was stopped, and the cell was disassembled for inspection. No deposition of magnesium hydroxide on the diaphragm was observable. The current efficiency during this operation was 71.3 percent.

3.3.1.—When electrolysis was carried out under the same conditions as set forth above in Example 3.3. except for an electrolyte flow velocity of 2.6 cm./sec., the pH value was 9.9. After continuous operation for 12 hours, a deposited layer of magnesium hydroxide of approximately 1-mm. thickness was observable on the diaphragm over an area of 40-mm. height and 500-mm. width below the upper boundary of the diaphragm.

When the electrolysis was continued further for 48 hours (from the initial application of current), the thickness of the magnesium hydroxide layer became approximately 3 mm. The voltage between the electrodes at this time was 5.7 volts.

EXAMPLE 4

4.1.—An electrolytic cell similar to that of Example 3 but having electrodes of 300-mm. height and 500-mm. width was operated with an electrolyte flow velocity of 2.6 cm./sec., a supplied current of 60 amperes, and a current density of 4 a./dm.$^2$. Even after continuous operation for 240 hours, there was no deposition of magnesium hydroxide on the diaphragm. The pH value of the electrolyte in the cathodic chamber at the centre point of the uppermost part of the diaphragm at a perpendicular distance of 0.5 mm. therefrom was constantly 9.7.

4.2.—For a current density of 8 a./dm.$^2$ in the cell of Example 4.1 above, the sea water flow velocity was 10.5 cm./sec. The pH value under these conditions at the same measurement point was 9.5. Even after 170 hours of continuous operation, no deposition of magnesium hydroxide on the diaphragm was observable.

4.3.—In the cell as described above, only the sea water flow velocity was adjusted at 6.4 cm./sec., whereupon the pH value at the same measurement point was 9.8. Under these conditions a layer of magnesium hydroxide of approximately 1-mm. thickness was formed after 24 hours of continuous operation on the diaphragm over an area of 15-mm. height and 500-mm. width below the upper boundary thereof.

EXAMPLE 5

An electrolytic cell having electrodes 1 and 2 of 300-mm. height and 500-mm. width spaced 12 mm. apart, similarly as in Example 4 above, but having a diaphragm 3 positioned at equal distance (5 mm.) from each of the electrodes 1 and 2 was operated with a current density of 8 a./dm.$^2$ and an electrolyte flow velocity of 10.5 cm./sec. The pH value of the electrolyte at the uppermost part of the diaphragm was 9.9.

After 12 hours of continuous operation under these conditions a deposited layer of magnesium hydroxide of approximately 1-mm. thickness was observed over an area of 40-mm. height and 500-mm. width on the diaphragm below the uppermost part thereof.

EXAMPLE 6

6.1.—An electrolytic cell similar to that in Example 5 above but having electrodes of 100-mm. height and 500-mm. width was operated with an electrolyte flow velocity of 2.1 cm./sec. and a current density of 4 a./dm.$^2$. The pH value of the electrolyte at the uppermost part of the diaphragm was 8.3.

Even after 360 hours of continuous operation, no deposition whatsoever of magnesium hydroxide on the diaphragm was observable.

6.2.—The electrolytic cell as described in Example 6.1. above was operated with three different combinations of current densities and flow velocities as indicated in the following table, whereupon measured pH values of the electrolyte as also indicated were obtained.

| Current density, a./dm.$^2$ | Electrolyte flow velocity, cm./sec. | pH value |
|---|---|---|
| 6 | 6.0 | 8.4 |
| 8 | 6.0 | 8.3 |
| 8 | 10.0 | 8.5 |

In all three instants, no deposition whatsoever of magnesium hydroxide on the diaphragm was observable after 240 hours of continuous operation.

6.3.—The electrolytic cell as described in Example 6.1. above was operated with a concurrent density of 4 a./dm.$^2$, an electrolyte flow velocity in the cathodic chamber 5 of 4.0 cm./sec., and an electrolyte flow velocity in the anodic chamber 4 of 2.5 cm./sec.

After 240 hours of continuous operation, the voltage between the electrodes was 5.5 volts, and the current efficiency was 72.0 percent. During this operation, the pH value at the pH value measurement point at the uppermost part of the diaphragm was 8.4.

It should be understood, of course, that the foregoing disclosure relates to only a preferred embodiment of the invention and particular examples of practice and that it is intended to cover all changes and modifications of the examples of the invention herein chosen for the purposes of the disclosure, which do not constitute departures from the spirit and scope of the invention as set forth in the appended claims.

What we claim is:

1. A method for producing effective chlorine consisting of free chlorine gas and chlorine gas dissolved in sea water which comprises: causing sea water to flow steadily and simultaneously in parallel anodic and cathodic flow paths respectively on opposite sides of a porous diaphragm parallelly interposed between and spaced apart from parallel anode and cathode plates mutually in narrowly spaced-apart disposition; carrying out direct-current electrolysis of the sea water thus flowing as the electrolyte by applying a DC voltage across the anode and cathode plates thereby to produce chlorine at the anode plate in said anodic flow path; and obtaining said chlorine as a mixture of free chlorine gas and chlorine gas dissolved in sea water.

2. A method for producing effective chlorine as claimed in claim 1 in which the anodic and cathodic flow paths are upwardly directed, and electrolysis conditions including the velocities of the flow paths and applied electric power are adjusted so that the pH value of the electrolyte at a point in the cathodic flow path at the same height level as the uppermost part of the diaphragm and at a perpendicular distance of 0.5 mm. from the diaphragm surface toward the cathode plate is 9.7 or less to prevent deposition of magnesium hydroxide on the diaphragm and thereby to make possible continuous and economical production of effective chlorine in the anodic flow path.

3. A method for producing effective chlorine as claimed in claim 1 in which the velocity of flow of the electrolyte in each of the flow paths is at least 1 cm./sec.

4. A method for producing effective chlorine as claimed in claim 3 in which the velocities of flow of the electrolyte respectively in the anodic and cathodic flow paths are equal.

5. A method for producing effective chlorine as claimed in claim 3 in which the velocity of flow of the electrolyte in the anodic flow path is less than that in the cathodic flow path.

References Cited

UNITED STATES PATENTS

| 982,705 | 1/1911 | Bull | 204—263 |
| 3,135,674 | 6/1964 | Ruetschi | 204—263 |

HOWARD S. WILLIAMS, Primary Examiner

R. L. ANDREWS, Assistant Examiner

U.S. Cl. X.R.

204—263